US012606206B2

(12) United States Patent
Iyra et al.

(10) Patent No.: US 12,606,206 B2
(45) Date of Patent: Apr. 21, 2026

(54) FILTERING AUTONOMOUS DRIVING SIMULATION SCENARIOS

(71) Applicant: GM Cruise Holdings LLC, San Francisco, CA (US)

(72) Inventors: Alessandro Iyra, Oakland, CA (US); Vivek Rangaswamy, Oakland, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 144 days.

(21) Appl. No.: 18/056,320

(22) Filed: Nov. 17, 2022

(65) Prior Publication Data

US 2024/0166236 A1      May 23, 2024

(51) Int. Cl.
*B60W 60/00* (2020.01)

(52) U.S. Cl.
CPC ... *B60W 60/0011* (2020.02); *B60W 2420/408* (2024.01)

(58) Field of Classification Search
CPC ........ G06N 20/00; G06N 3/006; G06N 3/045; G06N 3/049; G06N 3/08; G06N 7/01; G06N 5/01; G08G 1/167; G08G 1/0112; G08G 1/0116; G08G 1/0129; G08G 1/0141; G08G 1/09626; G08G 1/096725; G08G 1/096741; G08G 1/09675; G08G 1/096758; G08G 1/096775; G08G 1/096783; G08G 1/162; G08G 1/163; G08G 1/166; G08G 1/164; G08G 1/202; G06T 1/0007; G06T 9/00; G06T 11/00; G06T 17/20; G06T 19/00; G06T 19/20; G06T 2207/10028; G06T 2207/10044; G06T 7/20; G05B 17/02; G06V 10/454; G06V 10/772; G06V 10/82; G06V 20/56; G06V 20/58; B60W 60/0011; B60W 2420/408; G06F 11/3684; G06F 30/20; G06F 11/3698; H10H 20/0363
See application file for complete search history.

(56) References Cited

U.S. PATENT DOCUMENTS

| | | | | |
|---|---|---|---|---|
| 2022/0161815 | A1* | 5/2022 | Van Beek | B60W 40/09 |
| 2022/0185323 | A1* | 6/2022 | Dolben | B60W 60/0011 |
| 2023/0112004 | A1* | 4/2023 | Hari | B60W 60/0015 |
| | | | | 701/23 |
| 2023/0159033 | A1* | 5/2023 | Dill | G05B 17/02 |
| | | | | 701/28 |
| 2023/0289281 | A1* | 9/2023 | Redford | G06F 11/3698 |
| 2024/0005547 | A1* | 1/2024 | Lin | G06T 7/70 |

* cited by examiner

*Primary Examiner* — Nga X Nguyen
(74) *Attorney, Agent, or Firm* — Honigman LLP; Matthew H. Szalach; Jonathan P. O'Brien

(57) ABSTRACT

A computer system for filtering autonomous driving scenarios for simulations includes circuitry and a graphical processing unit (GPU). The circuitry receives data encoding a first autonomous driving scenario, and generates a first embedding of the first autonomous driving scenario based on a model for transforming autonomous driving scenario data to an embedding. A GPU compares the first embedding to a test bank of embeddings representing other autonomous driving scenarios. If the first embedding has at least a threshold similarity to other embeddings in the test bank, the first autonomous driving scenario is discarded from a simulation pipeline for simulating autonomous driving scenarios.

14 Claims, 8 Drawing Sheets

100

Map Database
110

Simulation
parameters
130

Scenario
Generator 120

Scenarios
140

Simulation
Platform 150

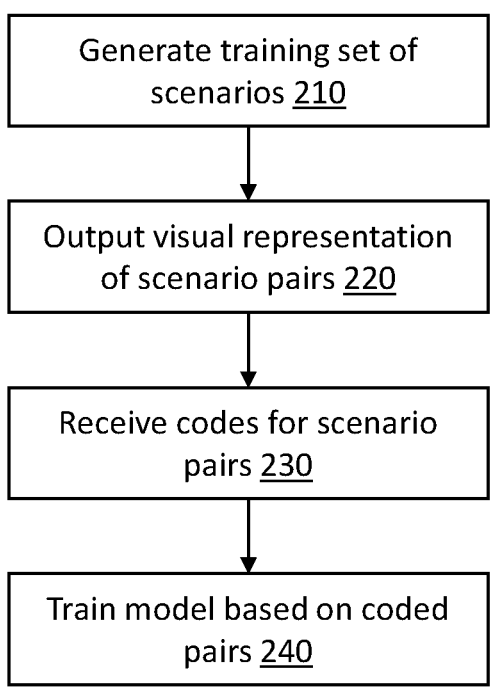

200

```
┌─────────────────────────────┐
│   Generate training set of  │
│      scenarios 210          │
└─────────────────────────────┘
              │
              ▼
┌─────────────────────────────┐
│  Output visual representation│
│   of scenario pairs 220     │
└─────────────────────────────┘
              │
              ▼
┌─────────────────────────────┐
│   Receive codes for scenario │
│        pairs 230            │
└─────────────────────────────┘
              │
              ▼
┌─────────────────────────────┐
│   Train model based on coded│
│         pairs 240           │
└─────────────────────────────┘
```

FILTERING AUTONOMOUS DRIVING SIMULATION SCENARIOS

BACKGROUND

Technical Field

The present disclosure generally relates to autonomous driving and, more specifically, simulation of driving scenarios to improve autonomous driving software.

Introduction

An autonomous vehicle (AV) is a motorized vehicle that can navigate without a human driver. An example autonomous vehicle can include various sensors, such as a camera sensor, a light detection and ranging (LIDAR) sensor, and a radio detection and ranging (RADAR) sensor, amongst others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 2 illustrates a process for training a model to produce an embedding for a simulation, according to some examples of the present disclosure;

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.
Overview AVs can encounter a wide variety of situations while driving, such as different roadway geometries, different locations of other vehicles and pedestrians, different behaviors of vehicles and pedestrians, etc. Real-world road tests are typically used to train AVs how to respond in various situations. However, real-world road tests may not encounter every possibility, which can leave edge cases that AV software may not have been trained to handle. Simulations can be used to train the AV for interesting and rare scenarios.

Simulation can be used to improve autonomous driving software and to expand the use of AVs in new environments. AVs can be tested by driving fleets of vehicles with AV sensor systems in a particular environment (e.g., a particular city). Over time, this exposes the AVs to the specific roadways within the environment, along with different scenarios along the roadways. Different scenarios may include, for example, different numbers and locations of nearby vehicles, different behaviors (e.g., maneuvers, speeds) of other vehicles, other dynamic elements in the environment (e.g., pedestrians, bicycles), roadway variations (e.g., lanes closed for construction), etc. While real-world testing is important to training AVs, it can be difficult to expose AVs to each and every situation that may arise. Relying solely on real-world training can also make it difficult to scale AV fleets, e.g., to introduce AVs in new cities.

Figure 1:
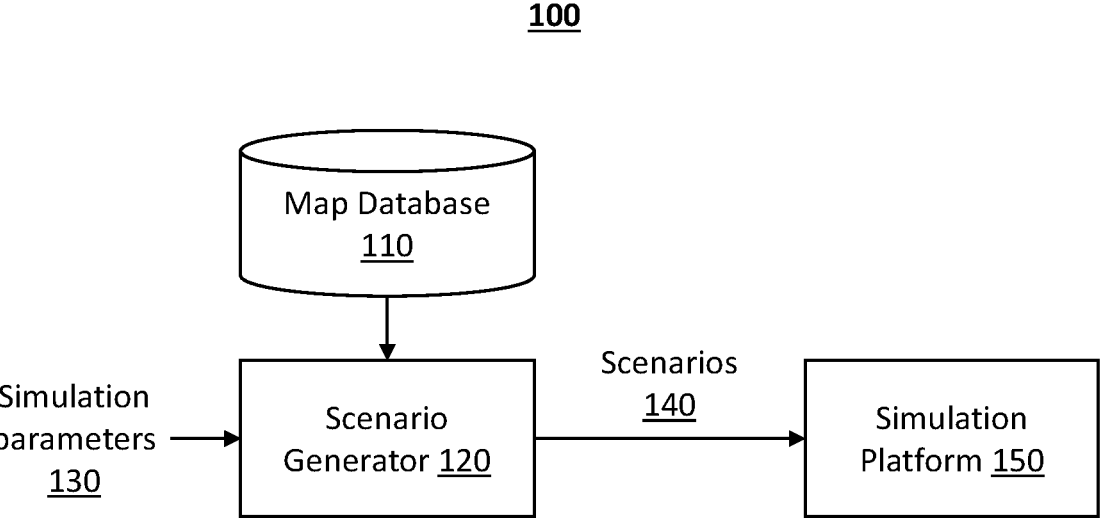
FIG. 1 illustrates a simulation environment, according to some examples of the present disclosure.

Simulation can be used to provide additional training for AV software. An example simulation environment 100 is illustrated in FIG. 1. The simulation environment 100 includes a map database 110, a scenario generator 120, and a simulation platform 150. The map database 110 includes data describing roadways, such as locations of roads, connections between roads, geometric information (e.g., road and lane widths, slopes, angles between roads), road names, speed limits, traffic flow regulations, toll information, etc. The map database 110 may also include data describing other features in or along the roads, such as bike lanes, sidewalks, crosswalks, traffic lights, stop signs, parking spaces, medians, etc. The map database 110 may further include data describing other features in the environments of the roads, such as data describing buildings (e.g., locations of buildings, building geometry, building types), trees, other signage, guardrails, streetlamps, lighting at different times of day, etc. The map database 110 may include data for a specific geographic area (e.g., a particular city, state, or other service area), or the map database 110 may include data across multiple geographic areas (e.g., multiple cities, all mapped portions of a country or the world, etc.).

The scenario generator 120 is a system for generating autonomous driving scenarios for simulation based on one or more specific locations in the map database 110. The scenario generator 120 may be implemented by one or more computer systems, e.g., the processor-based system illustrated in FIG. 8. The scenario generator 120 can select a location, or set of locations, in the map database 110 that match received simulation parameters 130. The simulation parameters 130 provide constraints for the scenario generator 120. For example, the simulation parameters 130 may indicate that a user wants to simulate three-way intersections with two stop signs. The scenario generator 120 searches the map database 110 to find locations that match the simulation parameters 130.

Having found the matching locations, the scenario generator 120 creates simulations at the identified locations. Different simulations may have different attributes, such as other vehicle types, vehicle locations, vehicle speeds, pedestrian activity, etc. In some cases, the simulation parameters 130 may include a particular scenario description, e.g., the AV is approaching a stop sign in the 3-way intersection, and another vehicle approaches from the road without a stop sign. The scenario generator 120 can generate various permutations of this scenario, e.g., including other vehicles in front of or behind the AV, a vehicle approaching from the third roadway, different pedestrian activity, different lighting conditions, etc.

The scenario generator 120 outputs the created autonomous driving scenarios 140 (referred to generally as "scenarios") to a simulation platform 150. The scenarios 140 may be in the form of data files. The data files may include data from the map database 110, or data identifying relevant data in the map database 110. The data files may encode data of the locations of all dynamic elements in the scene (e.g., the locations of the AV, other vehicles, pedestrians, bicycles, etc.). For example, the data files may include a three-dimensional simulation matrix encoding the environment of the AV, or a two-dimensional map encoding the environment of the AV. Additional data in the scenario data files may encode object velocities or other object behaviors, such as planned trajectories.

The simulation platform 150 enables testing and validation of autonomous driving algorithms. The simulation platform 150 runs simulations based on the created scenarios 140. The simulation platform 150 can reproduce real-world scenarios based on data from the scenarios 140. In some embodiments, the simulation platform 150 combines the scenario data 140 with data captured by AVs, e.g., rendering geospatial information and road infrastructure (e.g., streets, lanes, crosswalks, traffic lights, stop signs, etc.) obtained from the map database 110. In some embodiments, the simulation platform 150 models behavior of other vehicles, bicycles, pedestrians, and other dynamic elements. The simulation platform 150 simulates an AV's behavior and provides outputs of a simulated driving event, e.g., final locations of the AV and/or any other dynamic element in the simulation. The simulation platform 150 may be an example of the simulation platform 656, described with respect to an AV management system illustrated in FIG. 6.

Running simulations can accelerate AV development, e.g., to train the AV how to behave in new environments, and to train the AV how to behave in a wide variety of situations. The simulation environment 100 is particularly useful for training AV software for rare or unusual cases that may not arise in real-world testing, but that an AV may still encounter, e.g., after a testing phase. However, it can be challenging to identify unusual scenarios provided by the scenario generator 120 and ensure that they are simulated.

The scenario generator 120 may generate a very large number of scenarios 140. For example, if the geographic constraints result in a lot of matching locations (e.g., a four-way stop, or a two-lane highway), the scenario generator 120 may generate permutations on each of the matching locations, which can output a very large number of similar scenarios 140. Running simulations on a large number of duplicate or similar scenarios can consume a lot of computing resources and increases time spent on executing simulations without meaningfully improving the AV software. Selecting a smaller portion of the scenarios 140, e.g., through random selection, can reduce the number of scenarios, but may not select unique or interesting scenarios. Thus, a mechanism to identify unique scenarios can improve efficiency of the simulation (e.g., using computing resources and computing time to run more unique simulations, rather than simulating duplicate scenarios). This, in turn, leads to more meaningful improvement of the AV software.

Computer systems and methods are described herein that provide intelligent filtering or selection of scenarios 140 generated by the scenario generator 120. Machine learning is used to train a model for comparing a pair of scenarios to determine whether the scenarios are similar. Because the scenarios 140 may include a large amount of data, the scenario data is transformed into an embedding, where the embedding algorithm is trained by machine learning, e.g., a neural network. An embedding is a relatively low-dimensional space in which higher-dimensional data can be represented while preserving semantic relationships in the initial data set. For example, the embedding of the scenario data has a lower than the dimension than the scenario data itself. Embeddings can be particularly useful for representing sparse data, e.g., sparse vectors or sparse tensors, which include many 0 elements. The scenario data may be sparse data. The distance between two embeddings is used to determine whether two scenarios represented by the embeddings are similar.

As noted above, a set of simulation parameters 130 can result in a large number of scenarios 140, e.g., thousands or even millions of scenarios. Comparing all of these scenarios to identify unique scenarios is computationally intensive. As described herein, a graphical processing unit (GPU) is used to develop a test bank of scenarios, and parallel processing is used to compare a scenario output by the scenario generator 120 to the test bank. If the GPU determines that the scenario is sufficiently different from scenarios described by data in the test bank, the scenario is added to the test bank. The simulation platform 150 can run simulations on scenarios in the test bank, where the test bank includes unique scenarios, and reduces the number of similar scenarios.

Example Process for Training Model to Generate Scenario Embedding

FIG. 2 illustrates a process 200 for training a model to produce an embedding for a simulation, according to some examples of the present disclosure. The process 200 may be performed at least in part by the AI/ML platform 654, described below with respect to FIG. 6. In some embodiments, the deep learning neural network 700, described below with respect to FIG. 7, is used to train the model.

To train the model, the scenario generator 120 generates 210 a training set of scenarios. The scenario generator 120 may generate the training set based on one or more simulation parameters 130, or various sets of simulation parameters 130, as described with respect to FIG. 1. For example, the scenario generator 120 may generate multiple subsets of scenarios based on different sets of simulation parameters 130, e.g., a first subset of scenarios based on a four-way stop, a second subset of scenarios based on a two-lane highway, etc.

Figure 8:
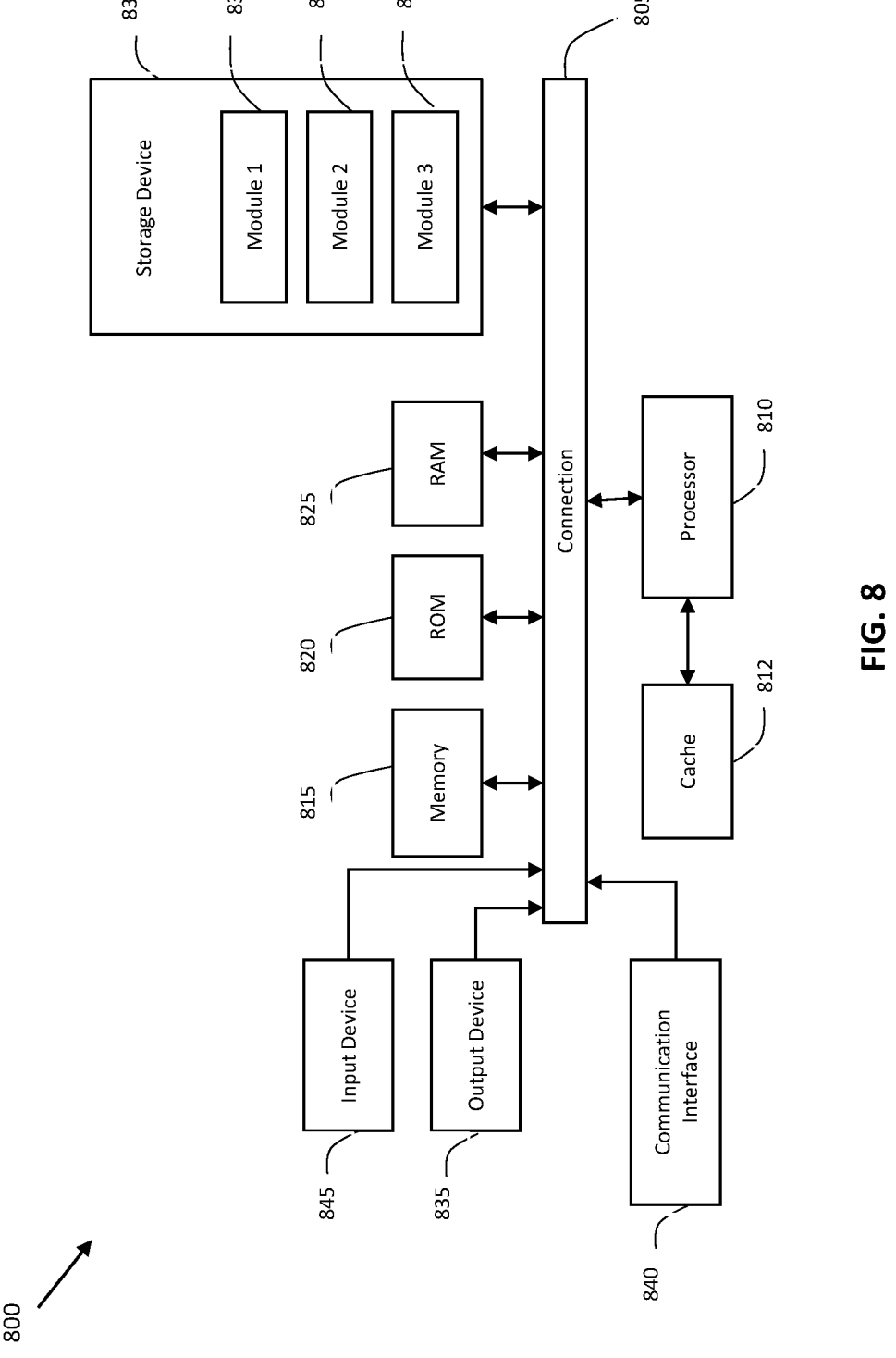
FIG. 8 illustrates an example processor-based system with which some aspects of the subject technology can be implemented.

A computer system outputs 220 a visual representation of pairs of scenarios from the training set. An example of a computer system that may generate an output a visual representation of scenarios is illustrated in FIG. 8. For example, a processor receives a subset of the training set of scenarios from the scenario generator 120 and selects a pair of scenarios from the subset (e.g., the first two scenarios, or a random set of scenarios). The processor generates a visualization of each of the pairs of scenarios, e.g., a two-dimensional top view, or map view, of the location (e.g., the roadways) and any dynamic actors in each scenario, including the AV. The visualization may include trajectory information, e.g., arrows showing projected trajectories of the actors, speed information, etc. The computer system outputs the visualizations of the pair of scenarios on a display screen.

A human labeler then labels the pair as being similar or dissimilar, and the computer system receives 230 codes for the scenario pairs. For example, similar pairs may be coded as "1" and dissimilar pairs coded as "0." The human labeler may assess the pairs as similar based on, for example, the types and relative locations of the actors, the road layout, speeds and/or trajectories of the actors, or other factors. The human labeler can input the code on an input device, e.g., a keyboard, and the codes, along with data identifying the scenario pairs coded by the human, are stored in a memory. After receiving a code for a first pair of scenarios, the computer system can generate a visualization of a second pair of scenarios (e.g., a second randomly-selected pair, or the third and fourth scenarios generated by the scenario generator 120) and receive a code for the second pair of scenarios from the human labeler, and so forth.

A computer system, e.g., the AI/ML platform 654, trains 240 a model based on the coded pairs stored in the memory. Prior to training the model, each scenario in each of the coded scenario pairs may be encoded. An encoding may represent the scenario in a different way from how the scenario is visualized. For example, for visualization, a three-dimensional scenario may be rendered as a two-dimensional map. For the encoding for the model, a scenario may be converted to a vector representation or tensor representation. In one embodiment, the scenario is raster-ized. In the raster encoding of a scenario, vectors or tensors may store the locations of objects at different timesteps. In some cases, the rasterization may compress the scenario data.

Different vectors in the raster, or different dimensions in the raster, may describe locations of different types of objects. In particular, within a given vector or given dimen-sion, each element may correspond to a different location within a given coordinate system and indicate whether a particular object is or is not at that location. For example, the encoding may include a first vector representing automo-biles, where each element represents a different physical location in the environment of the AV. For a given location, if an automobile is at that location, the element correspond-ing to that location is set to "1", and if an automobile is not at that location, the element is set to "0." A second vector in the encoding may represent locations of pedestrians, a third vector may represent locations of roads, a fourth vector may represent locations of traffic lights, etc. In some embodi-ments, rasterizing a scenario involves converting data from one reference frame to a different reference frame, e.g., into a frame based on the perspective of the AV. The locations of different objects within the AV frame coordinate system may be represented in the rasterized scenario.

The AI/ML platform 654 can train the model to generate embeddings based on the encoded representations of the scenarios. In particular, the model is trained to generate embeddings such that embeddings between similar scenarios have a short distance, and embeddings between different scenarios have a greater distance. For example, if the distance between embeddings is represented as a number between 0 and 1, similar embeddings, representing similar scenarios, have a similarity score at or near 1, representing a short distance between these scenarios, and different embeddings, representing different scenarios, have a simi-larity score at or near 0, representing a large distance between these scenarios. The model may be trained using machine learning, e.g., using a deep learning neural network 700, as described below with respect to FIG. 7. The embed-dings compress the scenario data to enable comparison between the scenarios. For example, embeddings generated according to the model may have a lower dimensionality than the rasters of the scenarios. As an example, the model may be a convolutional neural network (CNN). The sce-narios may rasterized, as described above, and the resulting rasters can be fed into the trained CNN, which generates the embedding based on the rasters.

Example Computer System for Filtering Scenarios

Figure 3:
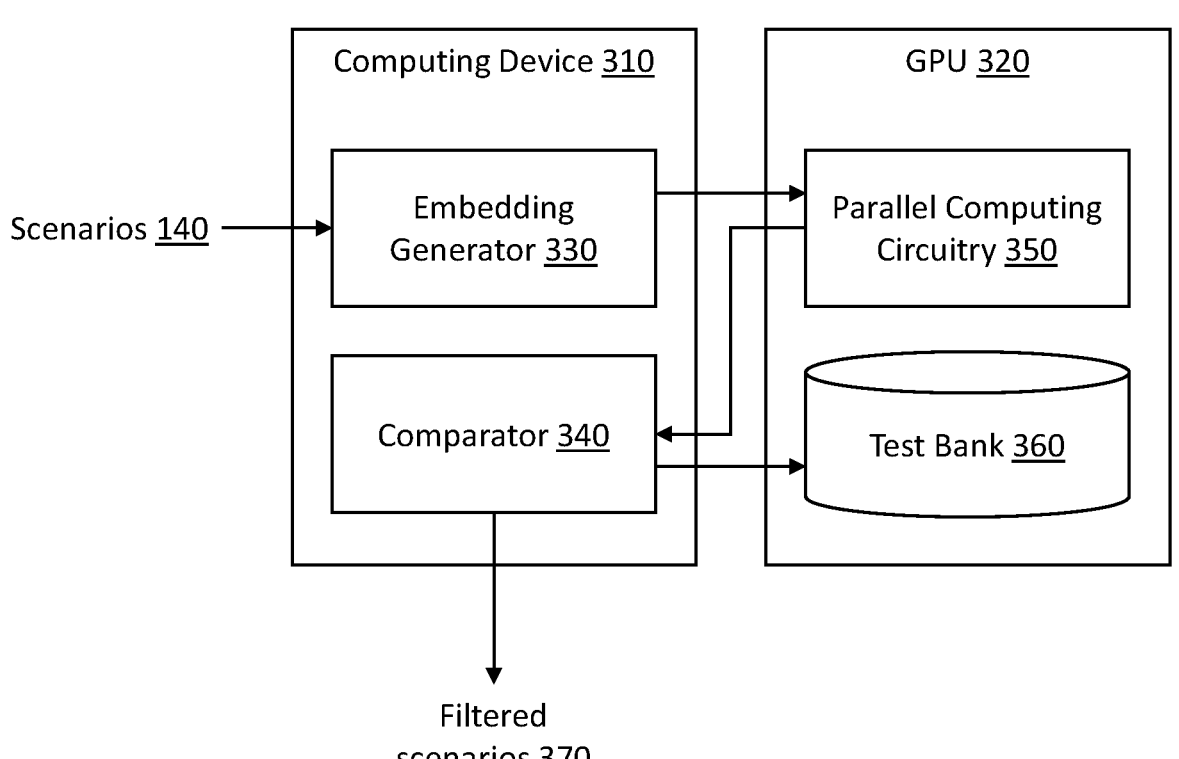
FIG. 3 illustrates a computing system for filtering a set of scenarios, according to some examples of the present disclosure.

FIG. 3 illustrates a computing system 300 for filtering a set of scenarios, according to some examples of the present disclosure. The computing system 300 includes a computing device 310 and a GPU 320. The computing device 310 may be an example of the processor-based system 800 described below with respect to FIG. 8. In this example, the computing device 310 includes an embedding generator 330 and a comparator 340. The GPU 320 is a computing device designed for parallel processing. In this example, the GPU 320 includes parallel computing circuitry 350 and a test bank 360. In general, GPUs were developed to accelerate rendering of graphics. Over time, GPUs have become more flexible and programmable, and can be used across a wide range of applications, not limited to graphics and video rendering. For example, GPUs can be used to accelerate workloads in artificial intelligence (AI), high performance computing (HPC), deep learning, image recognition, and other applications that can take advantage of the highly parallel nature of GPUs.

In some embodiments, the computing system 300 may have a different configuration than that shown, e.g., the computing system 300 may be distributed across multiple different devices (e.g., the computing device 310 may include cloud computing resources), the test bank 360 may be stored on the computing device 310 or on another memory outside the GPU 320, etc. The computing system 300 may sit between the scenario generator 120 and the simulation platform 150, or the computing system 300 (or functionalities described as being performed by the com-puting system) may be integrated into the scenario generator 120 and/or the simulation platform 150.

The embedding generator 330 may be software executing on the computing device 310 to generate embeddings based on received scenarios 140. As described with respect to FIG. 1, the scenarios 140 are generated by the scenario generator 120. The embedding generator 330 relies on a trained model, e.g., the model trained according to the process 200, to generate an embedding based on scenario data. As described with respect to FIG. 2, the scenario data may first be compressed prior to generating the embeddings. For example, the scenario data may be rasterized and then fed into a CNN, which outputs an embedding based on the raster. The embedding generator 330 may compress the scenario data prior to generating an embedding. Alterna-tively, a separate module (e.g., a separate software module of the computing device 310, the scenario generator 120, or a separate device coupled to the computing device 310) may compress the scenario data and pass the compressed scenario data to the embedding generator 330.

The embedding generator 330 outputs embeddings to parallel computing circuitry 350 of the GPU 320. For a given embedding received from the embedding generator 330, the parallel computing circuitry 350 accesses embeddings stored in a test bank 360, and the parallel computing circuitry 350 compares the received embedding to each of the stored embeddings to determine distances between the received embedding and each of the stored embeddings, which may be represented as similarity scores between the received embedding and each of the stored embeddings. The parallel computing circuitry 350 can compare the received embedding to each of the stored embeddings in parallel. For example, for a received embedding, a single GPU may be able to calculate similarity scores to thousands or even millions of stored embeddings in parallel. If a test bank 360 includes more embeddings than the parallel computing circuitry 350 can process in parallel, multiple GPUs 320 may be used, or different sets of embeddings in the test bank 360 may be compared to the received embedding in sequence. In the CNN example described with respect to FIG. 2, the parallel computing circuitry 350 may calculate an absolute difference between the two embeddings generated using the trained CNN. In some embodiments, a further computation may be performed on the absolute difference to generate a distance or similarity score between 0 and 1, e.g., a dense layer with a sigmoid unit may convert the absolute difference to a similarity score between 0 and 1.

The parallel computing circuitry 350 outputs the distances or similarity scores between the received embedding and each of the stored embeddings in the test bank 360 to the comparator 340. The comparator 340 determines whether the received embedding (i.e., the embedding output by the embedding generator 330 to the GPU 320) is similar to any of the embeddings in the test bank 360 based on the computed similarity scores. For example, the comparator 340 may compare the computed similarity scores to a threshold, e.g., 0.99, 0.95, 0.9, or 0.8, if 1 represents similar scenarios, and 0 represents different scenarios. If an embedding is sufficiently similar to an embedding already in the test bank 360 (e.g., at least one of the similarity scores is above the threshold), the scenario may be discarded or removed, e.g., removed from the test selection process and not stored in the test bank 360. If the embedding is not sufficiently similar to an embedding already in the test bank 360 (e.g., none of the similarity scores are above the threshold), the embedding representing the scenario is added to the test bank 360, and the scenario is output as a filtered scenario 370. The filtered scenarios 370 can be provided to the simulation platform 150 so that the simulation platform 150 runs simulations on unique scenarios.

While the comparator 340 is illustrated as being implemented by the computing device 310, in other embodiments, the comparison step is also performed on the GPU 320 by the parallel computing circuitry 350. In this case, the parallel computing circuitry 350 may output data indicating whether the received embedding has at least a threshold similarity to any of the embeddings in the test bank 360.

In some embodiments, the comparator 340 may select some similar scenarios for simulation, and store some similar scenarios in the test bank 360. For example, rather than discarding a scenario if at least one of the similarity scores is below the threshold, the comparator 340 may discard a scenario if at least a threshold number of the similarity scores (e.g., at least 5 similarity scores, or at least 20 similarity scores) are above the threshold. In such embodiments, the simulation platform 150 runs some similar simulations, but can significantly reduce the number of similar simulations that are run.

If a distance between any pair of scenarios is ambiguous, the computing system 300 may output the scenario pair for a human labeler to assess, e.g., as described with respect to FIG. 2. For example, if a pair has a similarity score in a range of, e.g., 0.5 to 0.8, it can be considered ambiguous. The human-provided label may be used to determine whether a scenario is discarded, or if it is added to the test bank and run by the simulation platform 150. Human labels on ambiguous pairs of scenarios can also be used to refine the model for generating the embedding, as described with respect to FIG. 5A.

Example Process for Filtering Scenarios

Figure 4:
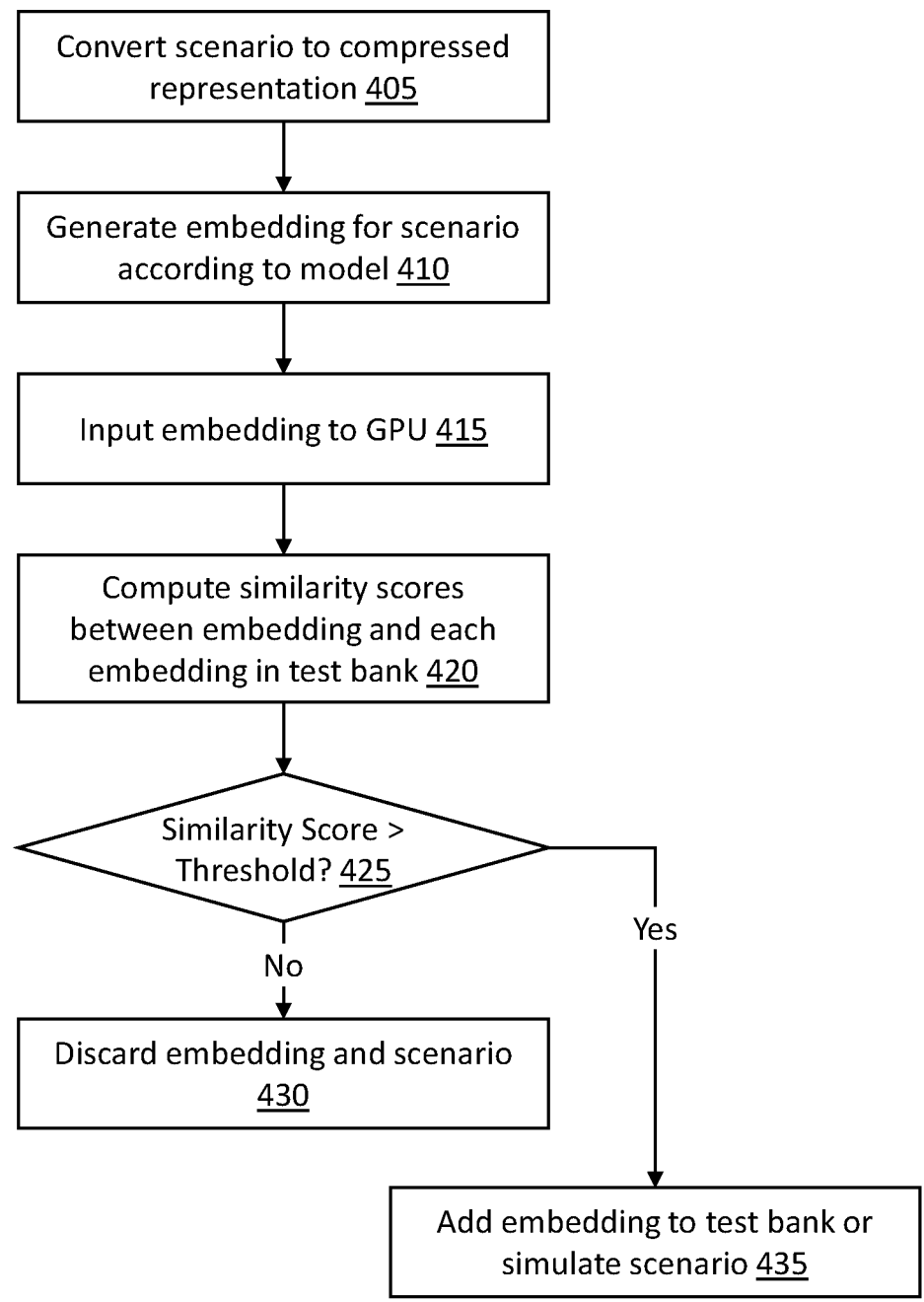
FIG. 4 illustrates a process for filtering a set of scenarios and selecting scenarios for simulation, according to some examples of the present disclosure.

FIG. 4 illustrates a process 400 for filtering a set of scenarios and selecting a subset of scenarios for simulation, according to some examples of the present disclosure. The process 400 may be performed by the computing system 300 shown in FIG. 3. The process 400 may be repeated for each of a set of scenarios, e.g., each of the scenarios 140 generated by the scenario generator 120 based on a set of simulation parameters 130. As the process 400 is repeatedly performed, the test bank 360 grows, and scenarios are provided to the simulation platform 150 to run.

The computing system 300, e.g., the embedding generator 330, converts 405 a scenario (e.g., a scenario 140 output by the scenario generator 120) to a compressed representation. As noted above, in other embodiments, different systems, devices, or software modules may convert the scenario data to a compressed representation.

The computing system 300, e.g., the embedding generator 330, generates 410 an embedding for the scenario according to a machine-learned model, e.g., the model learned in FIG. 2.

The computing system 300, e.g., the computing device 310, inputs 415 the embedding into a GPU. For example, the embedding generator 330 outputs the embedding, and a communications interface transmits the embedding to the GPU 320 shown in FIG. 3.

The computing system 300, e.g., the GPU 320 computes 420 similarity scores between the embedding and other embeddings stored in a test bank, e.g., the test bank 360. As described with respect to FIG. 3, the GPU 320 is able to compute similarity scores between the embeddings and a large number of other embeddings in parallel, e.g., computing a similarity score between a first embedding and a second embedding (one embedding in the test bank 360) while simultaneously computing a similarity score between the first embedding and a third embedding (another embedding in the test bank 360). As the test bank 360 grows to include more embeddings, this enables the GPU 320 to efficiently compare embeddings.

The computing system 300, e.g., the comparator 340, compares 425 the embedding similarity scores computed by the GPU 320 to a threshold similarity score. If one, or another threshold number, of the similarity scores is greater than the threshold similarity scores (representing that the scenario represented by the embedding is not sufficiently unique), the computing system 300 discards 430 the embedding and the scenario. The embedding is not added to the test bank 360, and the simulation platform 150 does not simulate the scenario.

If the threshold number of similarity scores are not greater than the threshold similarity score (representing that the scenario represented by the embedding is sufficiently unique), the computing system 300 adds 435 the embedding to the test bank 360 and provides the scenario to the simulation platform 150 to simulate the scenario.

Example Processes for Refining Model

Figure 5A:
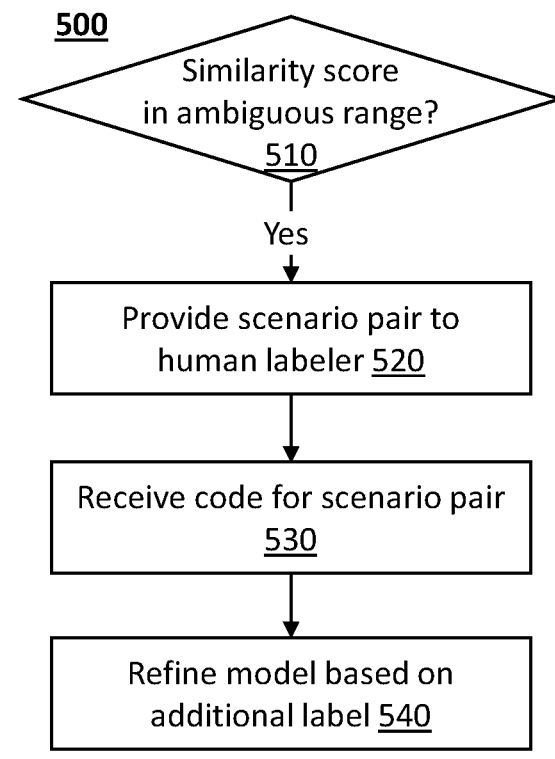
FIGS. 5A and 5B illustrate example processes for refining the model for generating an embedding for a scenario, according to some examples of the present disclosure.
Figure 5B:
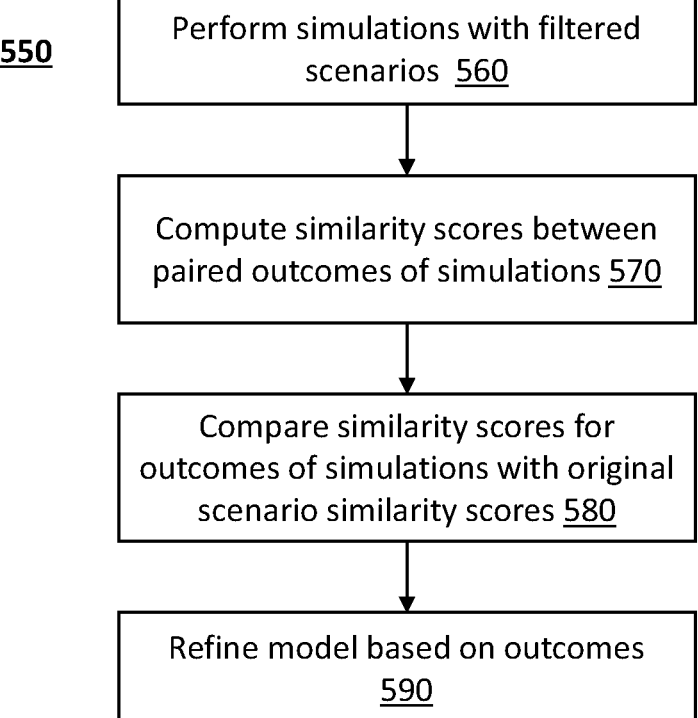

FIGS. 5A and 5B illustrates two example processes for refining the model for generating an embedding for a scenario, according to some examples of the present disclosure. FIG. 5A illustrates a process 500 for refining a model based on seeking additional human labels. The comparator 340 determines 510 if a distance or similarity score between two embeddings representing a scenario pair is in an ambiguous range. For example, if the embedding pair has a similarity score in a range of, e.g., 0.5 to 0.8, it can be considered ambiguous.

A computer system provides 520 the scenario pair to a human labeler. For example, the computer system may generate a visualization of the scenario pair and output the visualization on a display screen, as described with respect to FIG. 2. The computer system receives 530 a code for the ambiguous scenario pair from the human labeler.

The AI/ML platform 654 refines 540 the model to generate embeddings using the additional label for the ambiguous scenario pair. Training the model using additional codes for ambiguous pairs can improve the model with greater efficiency (e.g., using fewer coded pairs) than training the model with additional random pairs of scenarios.

In some embodiments, if, for example, a scenario being compared to the test bank was not determined to be similar to any scenarios in the test bank 360 (and thus the scenario was not already discarded), the human-provided label may also be used to determine whether a scenario is discarded, or if it is added to the test bank 360 and run by the simulation platform 150

FIG. 5B illustrates a process 550 for refining a model based on results from the simulation platform 150. The simulation platform 150 performs 560 simulations with a set of filtered scenarios, e.g., the filtered scenarios 370. Similarity scores between pairs of the filtered scenarios 370 had been calculated during the filtering process, and the similarity scores indicate whether pairs of the filtered scenarios 370 are similar or not. If a pair of scenarios have a short distance, it may be expected that the outcome of simulations of the scenarios are similar. For example, two scenarios may be similar if they have the same or similar sets of dynamic actors at the same or similar relative locations to the AV. In this case, after simulating the scenarios, it may be expected that properties of the dynamic actors are similar, e.g., their relative locations and speeds are similar. For a more specific example, if, in a scenario, an AV and another vehicle are approaching a two-way stop from opposite directions, and neither vehicle is planning to turn, at the end of the simulation, it may be expected that both vehicles have passed through the stop sign and are driving at moderate speeds.

After performing the simulation, a computing system (e.g., the computing system 300) computes 570 similarity scores between paired outcomes of simulations. The simulation outcomes may be similar to the scenario data described with respect to FIG. 1, e.g., they may have a similar data structure or the same data structure. The simulation outcomes can be compressed and then turned into embeddings, using the procedure described above for the scenarios. A computing system (e.g., the computing system

300) computes similarity scores between one or more pairs of embeddings. The computing system may not discard pairs in the manner described with respect to FIG. 4, but instead, may store similarity scores between each permutation of embedding pair. The computing system may use parallel processing, e.g., using the GPU, to improve efficiency of the similarity score calculations. Rather than discarding certain pairs, each embedding may be stored in the test bank.

A computing system (e.g., the computing system 300) compares 580 the similarity scores between pairs of simulation outcomes with similarity scores of the corresponding scenario pairs. The computing system may specifically identify scenario pairs in which the starting scenario distance is significantly different from the simulation outcome distance, e.g., the difference between the similarity score is at least 0.3, 0.5, or 0.7. For example, the computer system 300 determines that a pair of scenarios have a high similarity score (e.g., 0.95) based on the embeddings of the starting scenarios, indicating that the scenarios are similar. The computer system 300 determines that the outcomes of the simulations based on the pair of scenarios have a relatively small similarity score (e.g., 0.25) based on the embeddings of the simulation outcomes, indicating that the outcomes are different.

The AI/ML platform 654 refines 590 the model for generating the embeddings based on the similarity score comparison. For the pair of scenarios described above, the 0.25 similarity score between the scenario outcomes may indicate that the scenarios are in fact different, and the model can be updated to better reflect the difference between the scenarios. For example, any pairs of simulations where the scenario distance is different from the outcome distance can be used to refine the model, e.g., by changing the label for the scenario pair based on the simulation outcomes.

Example AV Management System

Figure 6:
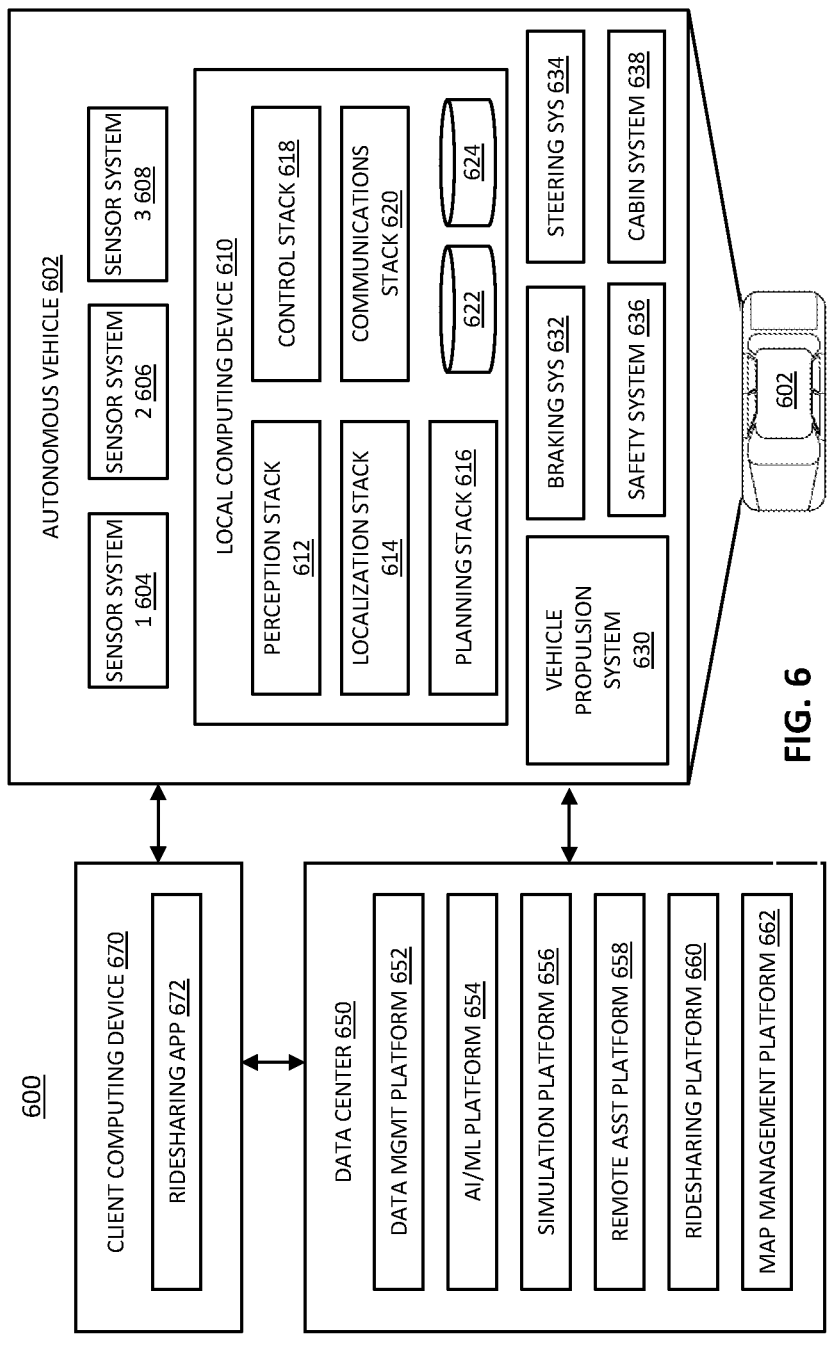
FIG. 6 illustrates an example system environment that can be used to facilitate autonomous vehicle (AV) dispatch and operations, according to some aspects of the disclosed technology.
Figure 7:
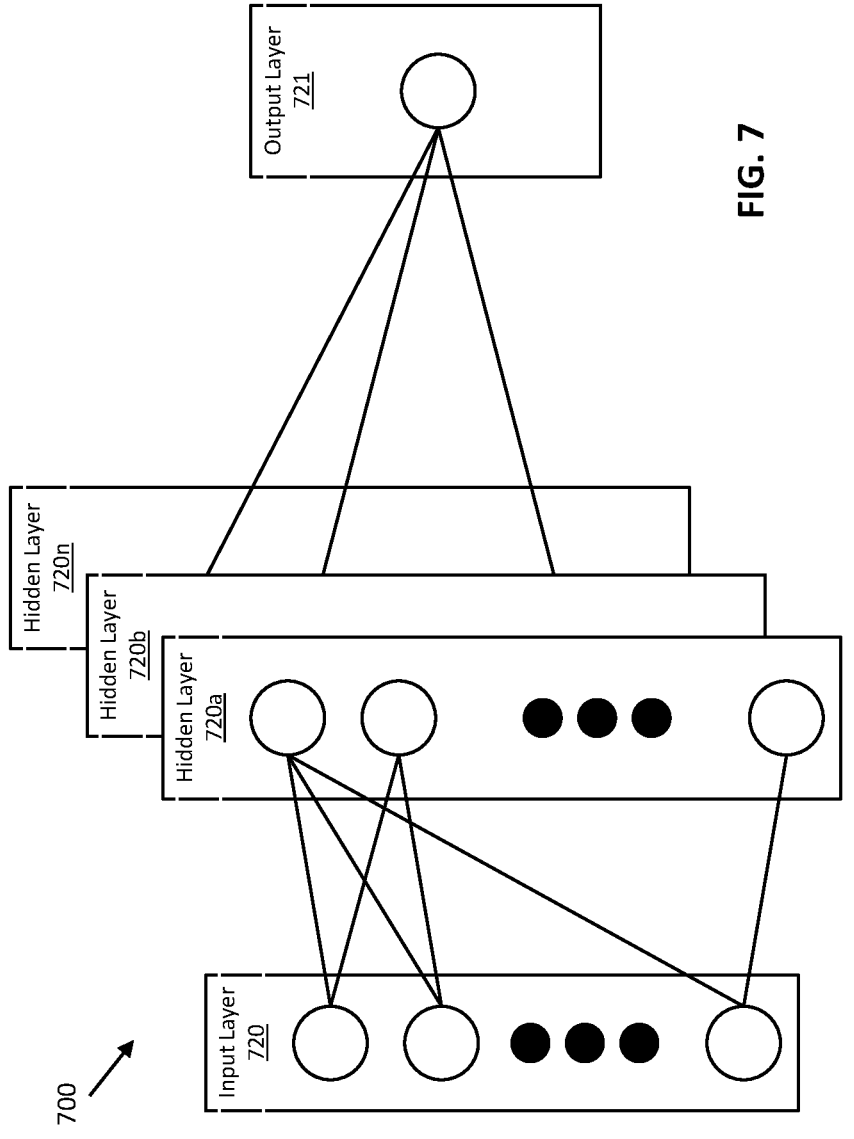
FIG. 7 illustrates an example of a deep learning neural network that can be used to implement a perception module and/or one or more validation modules, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 436, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on. The AI/ML platform 654 may train a model to generate embeddings based on encoded representations of the scenarios, as described with respect to FIGS. 1-5.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Example Neural Network Model

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above, or all of a portion of a module for comparing two simulation scenarios, as discussed above. An input layer 720 can be configured to receive sensor data and/or data relating to an environment surrounding an AV. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 721 that provides an output resulting from the processing performed by the hidden layers 722a, 722b, through 722n. In one illustrative example, the output layer 721 can provide estimated treatment parameters, that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722*a*, 722*b*, through 722*n* in order to provide the output through the output layer 721.

In some cases, the neural network 700 can adjust the weights of the nodes using a training process called back-propagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target - output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Processor-Based System

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLU-ETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Program-mable ROM (PROM), Erasable PROM (EPROM), Electri-cally Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the func-tional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another commu-nications connection (either hardwired, wireless, or combi-nation thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose com-puter, special purpose computer, or special purpose process-ing device to perform a certain function or group of func-tions. Computer-executable instructions also include program modules that are executed by computers in stand-alone or network environments. Generally, program mod-ules include routines, programs, components, data struc-tures, objects, and the functions inherent in the design of special-purpose processors, etc. that perform tasks or imple-ment abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of com-puter system configurations, including personal computers, hand-held devices, multi-processor systems, microproces-sor-based or programmable consumer electronics, network Personal Computers (PCs), minicomputers, mainframe com-puters, and the like. Embodiments may also be practiced in distributed computing environments where tasks are per-formed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a method including receiving data describing a first autonomous driving scenario; gener-ating a first embedding of the first autonomous driving scenario based on a model for transforming autono-mous driving scenario data to an embedding, the first embedding having a lower dimensionality than the received data; inputting the first embedding to a graphi-cal processing unit (GPU); comparing, by the GPU, the first embedding to a second embedding of a second autonomous driving scenario; and in response to deter-mining that the first embedding has at least a threshold similarity to the second embedding, discarding the first autonomous driving scenario from a simulation pipe-line for simulating autonomous driving scenarios.

Example 2 provides the method of example 1, where generating the first embedding of the first autonomous driving scenario further includes compressing the data describing the first autonomous driving scenario into a compressed representation having a first dimension; and generating the first embedding based on the com-pressed representation, the first embedding having a second dimension lower than the first dimension.

Example 3 provides the method of example 1, where the model for transforming autonomous driving scenario data to an embedding includes a machine-learned model trained using coded pairs of embeddings.

Example 4 provides the method of example 1, further including comparing, by the GPU, the first embedding to a third embedding of a third autonomous driving scenario in parallel with the GPU comparing the first embedding to the second embedding.

Example 5 provides the method of example 4, where the GPU compares the first embedding to each of a test bank of embeddings, the test bank including the second embedding and the third embedding.

Example 6 provides the method of example 1, further including comparing, by the GPU, a third embedding of a third autonomous driving scenario to the second embedding; and in response to determining that the third embedding and the second embedding have at least a threshold similarity score, adding the third autonomous driving scenario to a simulation pipeline for simulating autonomous driving scenarios.

Example 7 provides the method of example 6, further including adding the third embedding to a test bank of embeddings, the test bank further including the second embedding.

Example 8 provides a system for filtering autonomous driving simulation scenarios, the system including circuitry to receive data describing a first autonomous driving scenario; generate a first embedding of the first autonomous driving scenario based on a model for transforming autonomous driving scenario data to an embedding, the first embedding having a lower dimensionality than the received data; and determine whether to filter the first embedding based on a similarity score between the first embedding and a second embedding in a test bank; and a graphical processing unit (GPU) to compare the first embedding to a plurality of embeddings in the test bank, and the GPU to perform comparisons between the first embedding and embeddings in the test bank in parallel; and output a similarity score between the first embedding and the second embedding in the test bank.

Example 9 provides the system of example 8, where the circuitry is further to compress the data describing the first autonomous driving scenario into a compressed representation having a first dimension; and generate the first embedding based on the compressed representation, the first embedding having a second dimension lower than the first dimension.

Example 10 provides the system of example 8, where the model for transforming autonomous driving scenario data to an embedding includes a machine-learned model trained using coded pairs of embeddings.

Example 11 provides the system of example 8, the GPU further to compare the first embedding to a third embedding of a third autonomous driving scenario in parallel with comparing the first embedding to the second embedding.

Example 12 provides the system of example 11, where the GPU is to compare the first embedding to each of a test bank of embeddings, the test bank including the second embedding and the third embedding.

Example 13 provides the system of example 8, the GPU further to compare a third embedding of a third autonomous driving scenario to the second embedding; and the circuitry further to add the third autonomous driving scenario to a simulation pipeline for simulating autonomous driving scenarios in response to determining that the third embedding and the second embedding have at least a threshold similarity score.

Example 14 provides the system of example 13, the circuitry further to add the third embedding to a test bank of embeddings, the test bank further including the second embedding.

Example 15 provides a non-transitory computer-readable medium storing instructions for filtering autonomous driving simulations, the instructions, when executed by a processor, cause the processor to receive data describing a first autonomous driving scenario; generate a first embedding of the first autonomous driving scenario based on a model for transforming autonomous driving scenario data to an embedding, the first embedding having a lower dimensionality than the received data; input the first embedding to a graphical processing unit (GPU); compare, by the GPU, the first embedding to a second embedding of a second autonomous driving scenario; and in response to determining that the first embedding has at least a threshold similarity to the second embedding, remove the first autonomous driving scenario from a simulation pipeline for simulating autonomous driving scenarios.

Example 16 provides the computer-readable medium of example 15, where the instructions are further to compress the data describing the first autonomous driving scenario into a compressed representation having a first dimension; and generate the first embedding based on the compressed representation, the first embedding having a second dimension lower than the first dimension.

Example 17 provides the computer-readable medium of example 15, where the model for transforming autonomous driving scenario data to an embedding includes a machine-learned model trained using coded pairs of embeddings.

Example 18 provides the computer-readable medium of example 15, further including comparing, by the GPU, the first embedding to a third embedding of a third autonomous driving scenario in parallel with the GPU comparing the first embedding to the second embedding.

Example 19 provides the computer-readable medium of example 18, where the GPU compares the first embedding to each of a test bank of embeddings, the test bank including the second embedding and the third embedding.

Example 20 provides the computer-readable medium of example 15, where the instructions are further to compare, by the GPU, a third embedding of a third autonomous driving scenario to the second embedding; and in response to determining that the third embedding and the second embedding have at least a threshold similarity score, add the third autonomous driving scenario to a simulation pipeline for simulating autonomous driving scenarios.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

23

What is claimed is:

1. A method comprising:

receiving data encoding a first autonomous driving scenario, wherein the first autonomous driving scenario indicates a set of objects in an environment, including locations and types of each object in the set of objects;

compressing the data encoding the first autonomous driving scenario into a rasterized encoding by converting the data encoding the first autonomous driving scenario from one reference frame to a different reference frame corresponding to a perspective of an autonomous vehicle, the rasterized encoding comprising vectors storing locations of the set of objects within a coordinate system;

generating a first embedding of the first autonomous driving scenario based on a model for transforming autonomous driving scenario data to an embedding, the first embedding generated from the rasterized encoding and having a lower dimensionality than the data encoding the first autonomous driving scenario, wherein the model is trained to output a value indicating a similarity of a set of autonomous driving scenarios and produce an embedding for each autonomous driving scenario input to the model;

inputting the first embedding and a second embedding of a second autonomous driving scenario to a graphical processing unit (GPU), wherein the second autonomous driving scenario corresponds to a set of scenarios selected for use in a simulation pipeline for simulating autonomous driving scenarios for testing and validating algorithms, machine learning models, and neural networks used by a real-world autonomous vehicle and the first autonomous driving scenario corresponds to a proposed scenario for use in the simulation pipeline;

comparing, by the GPU, the first embedding of the first autonomous driving scenario to the second embedding of the second autonomous driving scenario to determine a similarity between the first autonomous driving scenario and the second autonomous driving scenario;

in response to determining that the first embedding has less than a threshold similarity to the second embedding, adding the first autonomous driving scenario to the set of scenarios selected for use in the simulation pipeline;

performing, by the simulation pipeline, a first simulation based on the first autonomous driving scenario to produce a first simulation outcome;

performing, by the simulation pipeline, a second simulation based on the second autonomous driving scenario to produce a second simulation outcome;

determining an outcome similarity score between the first simulation outcome and the second simulation outcome; and in response to determining that a difference between the outcome similarity score and the similarity between the first autonomous driving scenario and the second autonomous driving scenario satisfies a refinement threshold, refining the model.

2. The method of claim 1, wherein the model is a machine-learned model that is trained using coded pairs of embeddings.

3. The method of claim 1, further comprising comparing, by the GPU, the first embedding to a third embedding of a third autonomous driving scenario in parallel with the GPU comparing the first embedding to the second embedding, wherein the third autonomous driving scenario is in the set of scenarios selected for use in the simulation pipeline.

4. The method of claim 1, further comprising:

comparing, by the GPU, a third embedding of a third autonomous driving scenario to the second embedding; and in response to determining that the third embedding and the second embedding have at least a threshold similarity score, adding the third autonomous driving scenario to the simulation pipeline for simulating autonomous driving scenarios.

5. The method of claim 4, further comprising adding the third embedding to a test bank of embeddings, the test bank further including the second embedding.

6. A system for filtering autonomous driving simulation scenarios, the system comprising:

circuitry to:

receive data encoding a first autonomous driving scenario, wherein the first autonomous driving scenario indicates a set of objects in an environment, including locations and types of each object in the set of objects;

compress the data encoding the first autonomous driving scenario into a rasterized encoding by converting the data encoding the first autonomous driving scenario from one reference frame to a different reference frame corresponding to a perspective of an autonomous vehicle, the rasterized encoding comprising vectors storing locations of the set of objects within a coordinate system;

generate a first embedding of the first autonomous driving scenario based on a model for transforming autonomous driving scenario data to an embedding, the first embedding generated from the rasterized encoding and having a lower dimensionality than the data encoding the first autonomous driving scenario, wherein the model is trained to output a value indicating a similarity of a set of autonomous driving scenarios and produce an embedding for each autonomous driving scenario input to the model; and input the first embedding and a second embedding of a second autonomous driving scenario to a graphical processing unit (GPU), wherein the second autonomous driving scenario corresponds to a set of scenarios selected for use in a simulation pipeline for simulating autonomous driving scenarios for testing and validating algorithms, machine learning models, and neural networks used by a real-world autonomous vehicle and the first autonomous driving scenario corresponds to a proposed scenario for use in the simulation pipeline;

compare the first embedding of the first autonomous driving scenario to the second embedding of the second autonomous driving scenario to determine a similarity between the first autonomous driving scenario and the second autonomous driving scenario; and the circuitry further to:

in response to determining that the first embedding has less than a threshold similarity to the second embedding, add the first autonomous driving scenario to the set of scenarios selected for use in the simulation pipeline;

perform, by the simulation pipeline, a first simulation based on the first autonomous driving scenario to produce a first simulation outcome;

perform, by the simulation pipeline, a second simulation based on the second autonomous driving scenario to produce a second simulation outcome;

determine an outcome similarity score between the first simulation outcome and the second simulation outcome; and in response to determining that a difference between the outcome similarity score and the similarity between the first autonomous driving scenario and the second autonomous driving scenario satisfies a refinement threshold, refine the model.

7. The system of claim 6, wherein the model is a machine-learned model trained using coded pairs of embeddings.

8. The system of claim 6, the GPU further to compare the first embedding to a third embedding of a third autonomous driving scenario in parallel with comparing the first embedding to the second embedding, wherein the third autonomous driving scenario is in the set of scenarios selected for use in the simulation pipeline.

9. The system of claim 6, the GPU further to compare a third embedding of a third autonomous driving scenario to the second embedding, and the circuitry further to add the third autonomous driving scenario to a simulation pipeline for simulating autonomous driving scenarios in response to determining that the third embedding and the second embedding have at least a threshold similarity score.

10. The system of claim 9, the circuitry further to add the third embedding to a test bank of embeddings, the test bank further including the second embedding.

11. A non-transitory computer-readable medium storing instructions for filtering autonomous driving simulations, the instructions, when executed by a processor, cause the processor to:

receive data encoding a first autonomous driving scenario, wherein the first autonomous driving scenario indicates a set of objects in an environment, including locations and types of each object in the set of objects;

compress the data encoding the first autonomous driving scenario into a rasterized encoding by converting the data encoding the first autonomous driving scenario from one reference frame to a different reference frame corresponding to a perspective of an autonomous vehicle, the rasterized encoding comprising vectors storing locations of the set of objects within a coordinate system;

generate a first embedding of the first autonomous driving scenario based on a model for transforming autonomous driving scenario data to an embedding, the first embedding generated from the rasterized encoding and having a lower dimensionality than the data encoding the first autonomous driving scenario, wherein the model is trained to output a value indicating a similarity of a set of autonomous driving scenarios and produce an embedding for each autonomous driving scenario input to the model;

input the first embedding and a second embedding of a second autonomous driving scenario to a graphical processing unit (GPU), wherein the second autonomous driving scenario corresponds to a set of scenarios selected for use in a simulation pipeline for simulating autonomous driving scenarios for testing and validating algorithms, machine learning models, and neural networks used by a real-world autonomous vehicle and the first autonomous driving scenario corresponds to a proposed scenario for use in the simulation pipeline;

compare, by the GPU, the first embedding of the first autonomous driving scenario to the second embedding of the second autonomous driving scenario to determine a similarity between the first autonomous driving scenario and the second autonomous driving scenario;

in response to determining that the first embedding has less than a threshold similarity to the second embedding, add the first autonomous driving scenario to the set of scenarios selected for use in the simulation pipeline;

perform, by the simulation pipeline, a first simulation based on the first autonomous driving scenario to produce a first simulation outcome;

perform, by the simulation pipeline, a second simulation based on the second autonomous driving scenario to produce a second simulation outcome;

determine an outcome similarity score between the first simulation outcome and the second simulation outcome; and in response to determining that a difference between the outcome similarity score and the similarity between the first autonomous driving scenario and the second autonomous driving scenario satisfies a refinement threshold, refine the model.

12. The computer-readable medium of claim 11, wherein the model is a machine-learned model that is trained using coded pairs of embeddings.

13. The computer-readable medium of claim 11, further comprising comparing, by the GPU, the first embedding to a third embedding of a third autonomous driving scenario in parallel with the GPU comparing the first embedding to the second embedding, wherein the third autonomous driving scenario is in the set of scenarios selected for use in the simulation pipeline.

14. The computer-readable medium of claim 11, wherein the instructions are further to:

compare, by the GPU, a third embedding of a third autonomous driving scenario to the second embedding; and in response to determining that the third embedding and the second embedding have at least a threshold similarity score, add the third autonomous driving scenario to the simulation pipeline for simulating autonomous driving scenarios.

* * * * *